(12) United States Patent
Williamson et al.

(10) Patent No.: US 7,151,349 B1
(45) Date of Patent: Dec. 19, 2006

(54) FAN SPEED CONTROL

(75) Inventors: Russell John Williamson, Patrickswell (IE); Elizabeth Anne Lillis, Corbally (IE)

(73) Assignee: Analog Devices, Inc., Norwood, MA (US)

( * ) Notice: Subject to any disclaimer, the term of this patent is extended or adjusted under 35 U.S.C. 154(b) by 230 days.

(21) Appl. No.: 10/821,035

(22) Filed: Apr. 8, 2004

(51) Int. Cl.
*H02P 7/06* (2006.01)

(52) U.S. Cl. ............ 318/254; 318/138; 318/439; 318/599

(58) Field of Classification Search ........ 318/139, 318/254, 439, 599; 388/827
See application file for complete search history.

(56) References Cited

U.S. PATENT DOCUMENTS

| | | | |
|---|---|---|---|
| 4,085,594 A | 4/1978 | Mayer | |
| 4,756,473 A | 7/1988 | Takemae et al. | |
| 4,817,865 A | 4/1989 | Wray | |
| 4,856,078 A * | 8/1989 | Konopka | 388/831 |
| 4,903,188 A | 2/1990 | Madhavan et al. | |
| 4,977,375 A | 12/1990 | Toth | |
| 5,057,968 A | 10/1991 | Morrison | |
| 5,102,040 A | 4/1992 | Harvey | |
| 5,467,607 A | 11/1995 | Harvey | |
| 5,484,012 A | 1/1996 | Hiratsuka | |
| 5,639,163 A | 6/1997 | Davidson et al. | |
| 5,710,519 A | 1/1998 | McCalpin et al. | |
| 5,714,938 A | 2/1998 | Schwabl | |
| 5,727,928 A | 3/1998 | Brown | |
| 5,731,954 A | 3/1998 | Cheon | |
| 5,777,897 A | 7/1998 | Giorgio | |
| 5,831,525 A | 11/1998 | Harvey | |
| 5,892,928 A | 4/1999 | Wallach et al. | |
| 5,905,867 A | 5/1999 | Giorgio | |
| 5,952,798 A * | 9/1999 | Jones et al. | 318/268 |
| 5,962,933 A | 10/1999 | Henderson et al. | |
| 5,987,554 A | 11/1999 | Liu et al. | |
| 5,990,582 A | 11/1999 | Henderson et al. | |
| 6,008,603 A * | 12/1999 | Jones et al. | 318/254 |
| 6,009,362 A | 12/1999 | Furukawa | |
| 6,037,732 A | 3/2000 | Alfano et al. | |
| 6,040,668 A * | 3/2000 | Huynh et al. | 318/471 |
| 6,054,823 A * | 4/2000 | Collings et al. | 318/439 |
| 6,055,489 A | 4/2000 | Beatty et al. | |
| 6,073,255 A | 6/2000 | Nouri et al. | |
| 6,104,003 A | 8/2000 | Jones | |
| 6,122,746 A | 9/2000 | Nouri et al. | |

(Continued)

FOREIGN PATENT DOCUMENTS

JP   10-307648   11/1998

(Continued)

OTHER PUBLICATIONS

"PWM Fan Speed Controller with Fault Detection", TelCom Semiconductor, Inc., Mar. 11, 1998, pp. 1-14.

(Continued)

*Primary Examiner*—Paul Ip
(74) *Attorney, Agent, or Firm*—Wolf, Greenfield & Sacks, P.C.

(57) ABSTRACT

A method of synchronizing a pulsed drive signal applied to a DC fan motor to the TACH output of the motor is described. DC motors include a rotor that rotates in a path defined by a plurality of magnetic poles and the method defines an ideal TACH output for a specific rotation speed of the rotor of the DC fan and changes the period of the drive signal if the monitored TACH output does not match the ideal TACH output such that the period of the drive signal matches the time taken for the fan to rotate through one magnetic pole of the fan.

46 Claims, 9 Drawing Sheets

U.S. PATENT DOCUMENTS

| | | | |
|---|---|---|---|
| 6,122,758 A | 9/2000 | Johnson et al. | |
| 6,134,667 A | 10/2000 | Suzuki et al. | |
| 6,134,668 A | 10/2000 | Sheikh et al. | |
| 6,138,250 A | 10/2000 | Nouri et al. | |
| 6,145,098 A | 11/2000 | Nouri et al. | |
| 6,163,266 A | 12/2000 | Fasullo et al. | |
| 6,163,825 A | 12/2000 | Wallach et al. | |
| 6,163,849 A | 12/2000 | Nouri et al. | |
| 6,169,442 B1 | 1/2001 | Meehan et al. | |
| 6,170,028 B1 | 1/2001 | Wallach et al. | |
| 6,170,067 B1 | 1/2001 | Liu et al. | |
| 6,173,346 B1 | 1/2001 | Wallach et al. | |
| 6,179,486 B1 | 1/2001 | Wallach et al. | |
| 6,182,180 B1 | 1/2001 | Liu et al. | |
| 6,182,232 B1 | 1/2001 | Klein | |
| 6,182,902 B1 | 2/2001 | Shih | |
| 6,188,189 B1 | 2/2001 | Blake | |
| 6,189,109 B1 | 2/2001 | Sheikh et al. | |
| 6,191,546 B1 | 2/2001 | Bausch et al. | |
| 6,192,434 B1 | 2/2001 | Wallach et al. | |
| 6,194,858 B1 | 2/2001 | Chen | |
| 6,195,717 B1 | 2/2001 | Henderson et al. | |
| 6,202,111 B1 | 3/2001 | Wallach et al. | |
| 6,202,160 B1 | 3/2001 | Sheikh et al. | |
| 6,208,616 B1 | 3/2001 | Mahalingam et al. | |
| 6,219,734 B1 | 4/2001 | Wallach et al. | |
| 6,219,795 B1 | 4/2001 | Klein | |
| 6,262,549 B1* | 7/2001 | Yang et al. | 318/463 |
| 6,271,638 B1 | 8/2001 | Erdman et al. | |
| 6,381,406 B1* | 4/2002 | Smith et al. | 318/799 |
| 6,400,113 B1 | 6/2002 | Garcia et al. | |
| 6,528,987 B1 | 3/2003 | Blake et al. | |
| 6,545,438 B1* | 4/2003 | Mays, II | 318/254 |
| 6,621,242 B1* | 9/2003 | Huang et al. | 318/268 |
| 6,737,860 B1* | 5/2004 | Hsu et al. | 324/161 |
| 6,815,916 B1* | 11/2004 | Horng et al. | 318/138 |
| 6,825,625 B1* | 11/2004 | Karwath et al. | 318/434 |
| 6,838,847 B1* | 1/2005 | Dragoi et al. | 318/434 |
| 6,940,235 B1* | 9/2005 | Getz et al. | 318/254 |
| 6,965,208 B1* | 11/2005 | Chen | 318/490 |
| 6,972,533 B1* | 12/2005 | Jordison et al. | 318/254 |
| 6,995,534 B1* | 2/2006 | Berroth et al. | 318/434 |
| 2002/0060544 A1* | 5/2002 | Teutsch et al. | 318/599 |
| 2003/0006724 A1* | 1/2003 | Getz et al. | 318/254 |
| 2003/0020460 A1* | 1/2003 | Hsu et al. | 324/161 |
| 2004/0263105 A1* | 12/2004 | Tsai et al. | 318/471 |
| 2005/0002657 A1* | 1/2005 | Wu et al. | 388/831 |
| 2005/0077849 A1* | 4/2005 | Chuan-Fa | 318/268 |
| 2005/0258789 A1* | 11/2005 | Getz et al. | 318/254 |

FOREIGN PATENT DOCUMENTS

| | | |
|---|---|---|
| JP | 10-341158 | 12/1998 |
| JP | 3062572 | 10/1999 |
| WO | WO 01/49093 | 7/2001 |

OTHER PUBLICATIONS

"MIC502—Fan Management IC, Advance Information", Micrel, Inc., Dec. 1998, pp. 1-16.

Paglia, Paul, "Interfacing Telecom's fan speed controllers to the 12C bus", TelCom Semiconductor, Inc., Sep. 18, 1997, pp. 1-3.

* cited by examiner

FAN SPEED CONTROL

FIELD OF THE INVENTION

The invention relates to DC fans and in particular to the control of the fan speed of such DC fans by a synchronization of the drive signal of the fan to a TACH output of the fan. In particular the invention relates to a DC fan controller adapted to enable detection and maintenance of the speed of the rotors of brushless DC fans. The invention particularly relates to a method and apparatus adapted to control the speed of the fan rotors based on user defined rotation values.

BACKGROUND TO THE INVENTION

DC brushless motor fans come in a variety of shapes and sizes. There are a number of fan types including radial, axial, or blower designs, and the fan type determines the airflow direction with respect to the fan body. Airflow rate is one of the most important specifications for a fan as this quantifies the fans ability to circulate air. This can vary in volume depending on fan blade design, fan construction, and speed of rotation. Most of these properties are set at the fan design stage, leaving only the speed of rotation available to the user to determine the airflow rate and hence the amount of cooling needed to maintain a safe operating environment. In order to control this fan speed parameter we need to look at the underlying controlling circuit in a fan.

A basic DC brushless motor consists of a number of key components and will be well known to those in the art. The motor includes a fixed part, the stator having a fan housing and an electronic assembly. The motor also includes moving parts including a rotor comprising a fan blade and a circular permanent magnetic strip attached to it. The electronic assembly contains a number of coils that can be electronically energised in sequence as the fan rotates. The energising sequence is synchronised to the fan rotation by a Hall effect sensor. This sensor is placed close to the circular permanent magnetic strip on the rotor and as the fan rotates the sensor detects the magnetic field of the passing magnet. The sensor output changes state every time a magnetic pole change is detected, i.e., going from a North Pole to a South Pole and visa versa. The permanent magnetic strip is made up of a number of magnetic pole pairs and thus it is possible to use the detection of the number of state changes of the sensor output to determine one full rotation of the fan.

The basic DC brushless fan has a 2-wire connection, one connects to a DC power source, and the other is the ground return. Becoming more common now is a third wire known as the 'tachometer output' or 'TACH'. This is a feedback signal from the fan representing the speed the fan is rotating at; in effect this is the Hall effect sensor output signal. An example of a TACH signal is shown in FIG. 1. As will be seen the signal is a square wave with a number of rising and falling edges separated by respective "high" and "low" levels. Each edge corresponds to a passage of a respective pole of the permanent magnet past the Hall sensor, so in effect a complete rotation of a fan having a four pole magnet will include two rising edges and two falling edges; a six pole magnet three rising edges and three falling edges and an eight pole magnet four rising edges and four falling edges. The fan construction determines the number of poles of the fan; this is the number of pole pairs that are passed in one complete rotation of the fan blade. To understand how this signal is generated we need to look at the basic fan drive circuit of a DC brushless motor, an example of which is given in FIG. 2.

The three leads from the fan are labelled:

The power lead, Vdd,

The ground lead, GND,

The Tachometer signal, TACH.

When Vdd is powered, the hall-effect sensor will initially be at a steady state, say GND. This is applied to the gate of transistor T1, keeping it in the off state, so coil 1 has no current flowing through it and therefore no voltage dropped across it. This in turn means the gate of T2 is pulled high, turning it on and therefore energizing coil 2. Energizing coil 2 has the effect of rotating the fan blade and once the hall-effect sensor detects the next pole change, its output changes state to high and the transistor states change, T2 turns off and T1 turns on, thus energizing coil 1, and causing the fan blade to rotate further until the next pole change is detected by the hall effect and the process repeats again.

Although a fan could be designed to operate either in a fully on or a full off position, it is more normal for the fan to operated at a number of different requirements depending on the conditions where the fan is operating. As such it is necessary to enable a control of the fan speed. There are several existing control schemes for controlling fan speed, including linear and pulse width modulation (PWM) control.

Linear control is also sometimes referred to as voltage control and relies on the principal that changing the voltage drive level to the fan will proportionally change the fan speed. Some fans will operate in this way, but not all. Typically, fans with internal electronic driver integrated circuits (ICs) require some minimum DC voltage to operate and therefore will stall below this level, sometimes this can be as high as 50% of the maximum allowed DC level.

In order to generate the variable DC level an interface circuit such as that shown in FIG. 3 is required. A digital-to-analogue converter supplies the variable voltage to this interface circuit and it then acts as a buffer to supply the current load demanded by the fan. At slower speeds the reduced voltage level across the fan means there is a larger voltage drop across the pass transistor Q1, therefore a lot of power is lost especially if the fan requires large current drive, and this in turn acts as a heat generator which stacks against the reason for needing a fan in the first place to cool the system. However, despite the drawbacks this control method has good acoustic performance as the reduced DC level helps to minimise the acoustic noise generated by the fan coil switching as it rotates. Therefore, although linear control is advantageous in that it is a proven technique endorsed by many fan vendors, has known reliable operation, there is extensive historical data available, has good acoustic performance and is easy to measure using the TACH signal it also suffers from a number of disadvantages. These include the fact that some fans do not operate at the lower voltage levels and this can reduce the range of speed of the fan. It is also difficult to determine the fan start and stall voltages and this requires calibration or characterization of every fan. Furthermore, such operation effects large power dissipation in power transistors (>5A fans) due to the voltage drop across transistor. This may require multiple external components such as for example amplifier/buffers, power transistors, gain setting resistors etc.

An alternative control technique is provided by pulse width modulation (PWM). PWM control is probably the simplest fan speed control technique available. The fan speed is changed by varying the Duty Cycle of a square-wave drive signal applied to the fan interface circuit, as shown in FIG. 4. The scheme is quite effective for most fan types but can present difficulties. The primary drawback is the fact that the PWM drive signal is not synchronized to the internal fan electronics, therefore the fan is being pulsed on and off regardless of where the fan is in its rotation cycle. The other drawback is the loss of the speed information. The PWM drive is asynchronous to the tachometer (TACH) output and there is therefore no way of knowing when successive TACH output changes occur. One way around this is to periodically keep the drive on for sufficient time to gather this speed information, thereby stretching the drive on-time.

FIG. 5 shows the PWM signal being held on for 1 TACH period. This stretching out of the drive on time can be for 1, 2 or more TACH periods depending on the accuracy required for the speed measurement. In order to maximize the speed accuracy, this stretching should last long enough to allow the fan complete one full rotation. However, stretching the drive on for this length will cause a very noticeable speeding up of the fan, particularly at lower speeds. This stretching can also cause a 'hunting' noise effect where the fan appears to speed up momentarily while the speed information is gathered. Therefore, although there are a number of advantages associated with this technique including the fact that it is a relatively simple low side driver fan drive interface, is a low cost solution and has relatively good speed control over a range of values, these have to be compared with the associated disadvantages such as the fact that the TACH signal is destroyed by drive switching, a 30 Hz to 100 Hz PWM frequency can cause audible ticks and buzzes, and the pulse stretching technique to measure fan speed can be audible at lower speeds, and causes speed variation.

Although hereinbefore described with reference to two and three wire fan systems it is also known to have a four wire system, the fourth wire providing an external feed or sync signal to the fan. U.S. Pat. No. 6,381,406 assigned to the Hewlett Packard Corporation describes a method and apparatus for controlling the speed of such a four wire voltage-controlled fan by locking the pulse-width modulated speed control voltage to a tachometer signal of the fan. By triggering the off time of the PWM pulse to the detection of the tachometer signal and ensuring the off time is less than one tachometer period, no phase and frequency information is lost. The synchronization is achieved by providing the fan controller with a system-generated speed signal SYNC and a tachometer signal TACH from the fan. When a voltage is applied to the fan, the fan rotor begins to spin and generates a tachometer signal TACH one or more times per full revolution of the rotor, each TACH signal having a fixed TACH period. The controller generates a pulse-width modulated signal PWM OUT which is used to turn the fan motor on and off. The controller adjusts the width of the PWM OUT pulses to the fan such that the fan's speed will either decrease or increase until the TACH signal matches the frequency and phase of the control signal SYNC. In order to allow the controller to properly operate using low-frequency PWM signals, the controller synchronizes the off time PWM OUT signal with the detection of the TACH signal and guarantees that the off time is always less than one TACH period. This ensures that the power to the fan is always turned on by the time the TACH signal arrives, and is therefore detected by the controller. Accordingly, accurate TACH data is available for calculation of the next "off" period of the power to the fan, and pulse width modulation can be accomplished at a TACH frequency of less than 200 Hz without losing any TACH phase or frequency information. However, as the synchronization requires a monitoring and correlation between the speed signal and the TACH signal, it can only be implemented in a four-wire system. Such systems, although known, are not the most prevalent of available fans and it is therefore desirable to provide a fan controller that enables a synchronization of the PWM drive signal yet does not require an externally generated sync signal to achieve this synchronization.

SUMMARY OF THE INVENTION

These and other needs of the prior art are addressed by a fan controller in accordance with the present invention which provides for an adjustment of the off time of the fan drive signal to match the ideal TACH output of the fan for that desired speed.

According to a first embodiment of the invention a fan controller is provided which is adapted to enable a synchronization of the drive signal applied to a DC fan motor with a TACH output of the motor. The controller achieves this synchronization by enabling a definition of an ideal TACH output for a specific rotation speed of a rotor of the DC fan, monitoring the actual TACH output of the DC fan, the TACH output indicating the passing of the magnetic poles of the fan by the rotor, comparing the monitored TACH output to the ideal TACH output, and changing the period of the drive signal if the monitored TACH output does not match the ideal TACH output such that the period of the drive signal matches the time taken for the fan to rotate through one magnetic pole of the fan.

As such, the invention provides a method of synchronizing a pulsed drive signal applied to a DC fan motor to the TACH output of the motor is provided, the method comprising the steps of:
 a) defining an ideal TACH output for a specific rotation speed of a rotor of the DC fan,
 b) monitoring the actual TACH output of the DC fan, the TACH output indicating the passing of the magnetic poles of the fan by the rotor,
 c) comparing the monitored TACH output to the ideal TACH output, and
 d) changing the period of the drive signal if the monitored TACH output does not match the ideal TACH output such that the period of the drive signal matches the time taken for the fan to rotate through one magnetic pole of the fan.

The duty cycle of the drive signal may be changed by changing the length of time, $T_{OFF}$, for which the drive signal is turned off. Typically, the drive signal is turned off each time, for the time $T_{OFF}$, when the actual TACH signal indicates that the fan rotor has rotated to the start of the next pole. In operation, the drive signal is usually turned on once the duration of $T_{OFF}$ is complete, the drive signal being turned off again once the actual TACH signal indicates that the fan rotor has rotated to the start of another pole of the fan.

In preferred embodiments, the actual TACH signal is only monitored when the drive signal is on. The monitoring of the actual TACH signal provides an indication of whether the actual TACH signal is at a high level or at a low level, the actual TACH signal flipping between the high and low levels on passing of a magnetic pole. Such monitoring of the level of the actual TACH signal provides a tracking of the rotation of the rotor of the fan.

In order to ensure that an accurate assessment of the actual TACH signal is made, the level of the TACH signal is typically monitored after a predetermined time delay, an electromechanical (EM) delay $T_{EM}$, has passed since the switching of the drive signal from an off condition to an on condition. The EM delay $T_{EM}$ may be determined by looking at a transition on the drive signal from off to on, and measuring the time it takes for the actual TACH signal to change state from high to low, if the true state is low.

The invention also provides for sampling the level of the TACH signal continuously while the drive signal is on. Such sampling may be done continuously when the drive signal is normally on, but what may additionally be provides is the step of sampling the level of the actual TACH signal during a time $T_{OFF}$ when the drive signal is normally off.

If such sampling is effected, it is desirably achieved by turning the drive signal on for a time period sufficient to enable a detection of the level of the TACH signal, and the level of the actual TACH signal is normally sampled more than once during the $T_{OFF}$ time. Typically, two sample signals are applied, a first sample signal at a time approximately equivalent to ¼ $T_{OFF}$ and the second at a time ½ $T_{OFF}$. The duration of each sample signal is desirably greater than the predetermined electromechanical delay $T_{EM}$ of the system.

Such sampling the level of the actual TACH signal during a time $T_{OFF}$ when the drive signal is normally off provides an indication as to whether the actual fan speed is a multiple of the speed indicated by the monitored actual TACH level. The invention may additionally provide the step, on determining that the actual speed is a multiple of the speed indicated by the monitored actual TACH level, of correcting the actual speed to reflect the monitored actual TACH level. Such a correction is desirably effected by reducing the duration of the off time $T_{OFF}$ of the drive signal, typically to a time period shorter than the time period for the fan rotor to pass adjacent poles, $T_{POLE}$.

The defined ideal TACH output may be provided by a look up table, which can optionally be a discrete mode look up table, a linear mode look up table, a ratio mode look up table or the like.

The defined ideal TACH output may also be provided by a plurality of user inputs. Such plurality of user inputs may include the number of poles of the fan and a rotation speed of the fan. The rotation speed of the fan may be provided as a direct input by the user or may be related to an operating temperature, the relationship being user defined. Such a user defined relationship may be effected by defining a range of temperature values and relating this defined range to a range of rotation speeds.

In preferred embodiments, the off time of the drive signal, $T_{OFF}$, is adjustable, an adjustment of $T_{OFF}$ effecting a change in the speed of the fan motor.

The invention additionally provides for a determination of the speed of the motor, the speed being determined by:
a) defining the number of poles of the fan,
b) determining when the rotor has passed a first pole of the plurality of poles,
c) determining when the number of poles passed by the rotor is equivalent to the defined number, and
d) calculating the time period between step b) and step c) so as to define a total time for a single rotation, thereby providing an indication of the actual speed of the fan motor.

The additional step of defining a desired speed for the fan motor may be included. Such a desired speed may be related to an operating temperature of the location of the fan motor. The off time of the fan motor, $T_{OFF}$, is typically adjustable until the desired speed substantially matches the actual speed. Such adjustment may include the amount by which the off time $T_{OFF}$ of the drive signal is adjusted. If such a variance in the amount by which $T_{OFF}$ is adjusted is provided, typically the variance is related to the difference between the desired speed and actual speed. Such adjustment may also or alternatively include the frequency at which the off time $T_{OFF}$ is adjusted is configurable. The frequency adjustment rate is desirably related to the characteristics of a particular fan.

The step of monitoring the change of the actual TACH levels so as to determine whether the fan has stalled may also be provided. A stall is defined by an occurrence of multiple sequentially monitored actual TACH levels being of the same level. On determining the occurrence of a stall, the drive signal may pulsed on and off until two sequentially monitored actual TACH levels are of a different level, thereby overcoming the stall.

The invention may also include the step of forcing the drive signal to a continuous on or a continuous off condition.

A DC fan speed controller which is adapted to synchronize a pulsed drive signal applied to a DC fan motor to the TACH output of the motor, the motor including a rotor that rotates in a path defined by a plurality of magnetic poles is also provided. Such a controller, in accordance with the an embodiment of the invention includes:
a) means for defining an ideal TACH output for a specific rotation speed of a rotor of the DC fan,
b) means for monitoring the actual TACH output of the DC fan, the TACH output indicating the passing of the magnetic poles of the fan by the rotor,
c) means for comparing the monitored TACH output to the ideal TACH output, and
d) means for changing the period of the drive signal if the monitored TACH output does not match the ideal TACH output.

The means for changing the period of the drive signal is normally adapted to enable a change in the period so as to ensure that the period of the drive signal matches the time taken for the fan to rotate through one magnetic pole of the fan.

The speed of the fan motor may be defined by:
a) a first register value defining the number of poles of the fan,
b) a first sensor adapted to determine when the rotor has passed a first pole of the plurality of poles, the first sensor being adapted to effect an update of a second register so as to increment the number of poles passed by the rotor
c) a comparator adapted to determine when the number of poles passed by the rotor and stored in the second register is equivalent to the defined number, and
d) a timer adapted to calculate the time period between step b) and step c) so as to define a total time for a single rotation, thereby providing an indication of the actual speed of the fan motor.

The ideal TACH output is typically related to the operating temperature of the fan.

The means for monitoring the actual TACH output of the DC fan is configured so as to monitor the actual TACH output when the drive signal is on.

These and other features of the present invention will be better understood with reference to the following drawings, which illustrate preferred embodiments of the invention. It will however be understood that such preferred embodiments are provided for illustrative purposes only and it is not intended to limit the present invention to any one specific configuration or embodiment except as may be deemed necessary in the light of the appended claims, as many modifications may and can be implemented without depart-

DETAILED DESCRIPTION OF THE DRAWINGS

Figure 1:
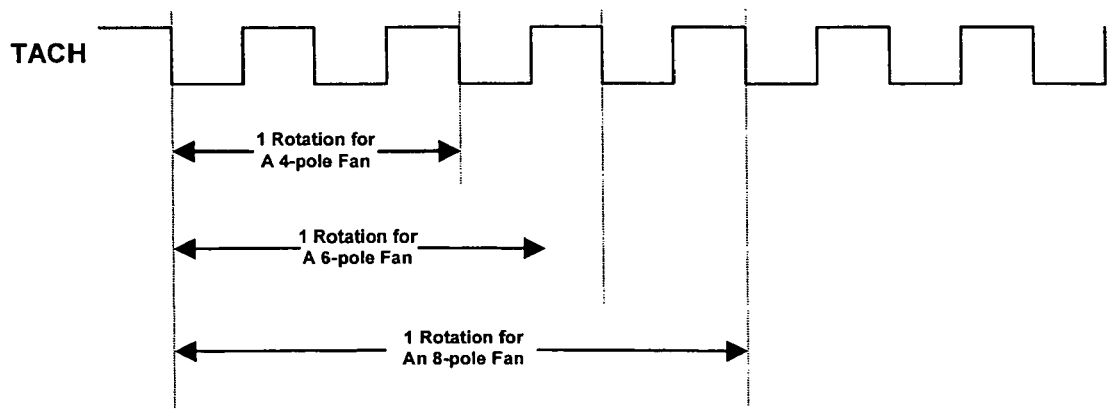
FIG. 1 is an example of a TACH signal.
Figure 2:
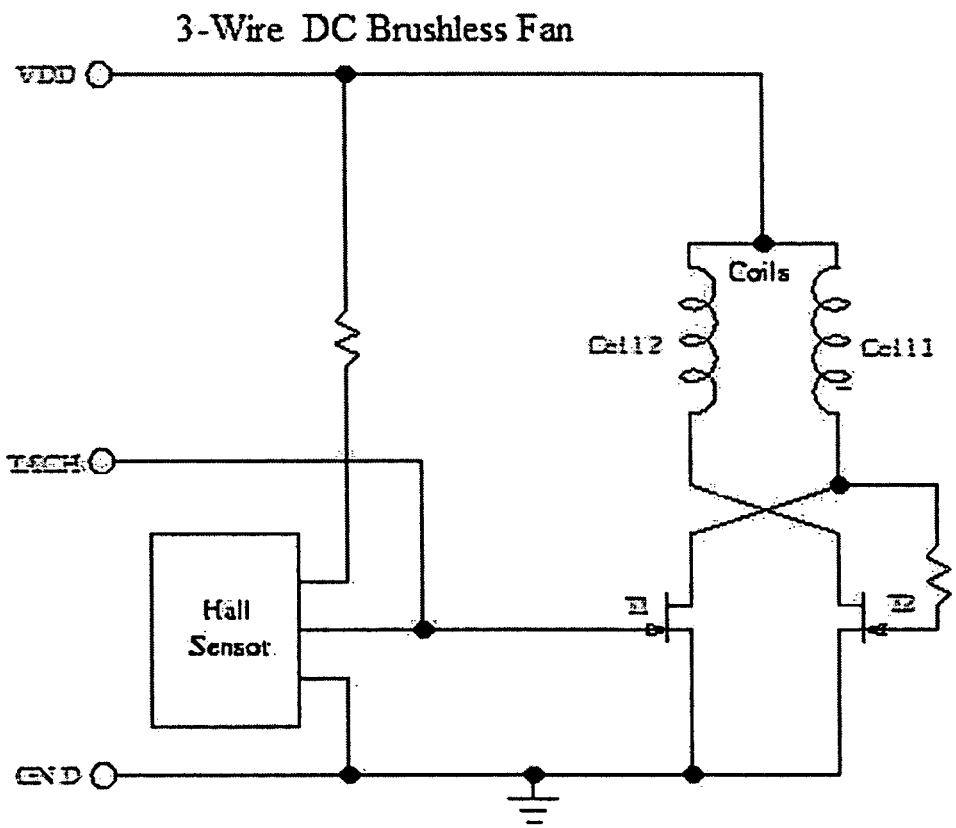
FIG. 2 is a basic known fan drive circuit of a DC brushless motor.
Figure 3:
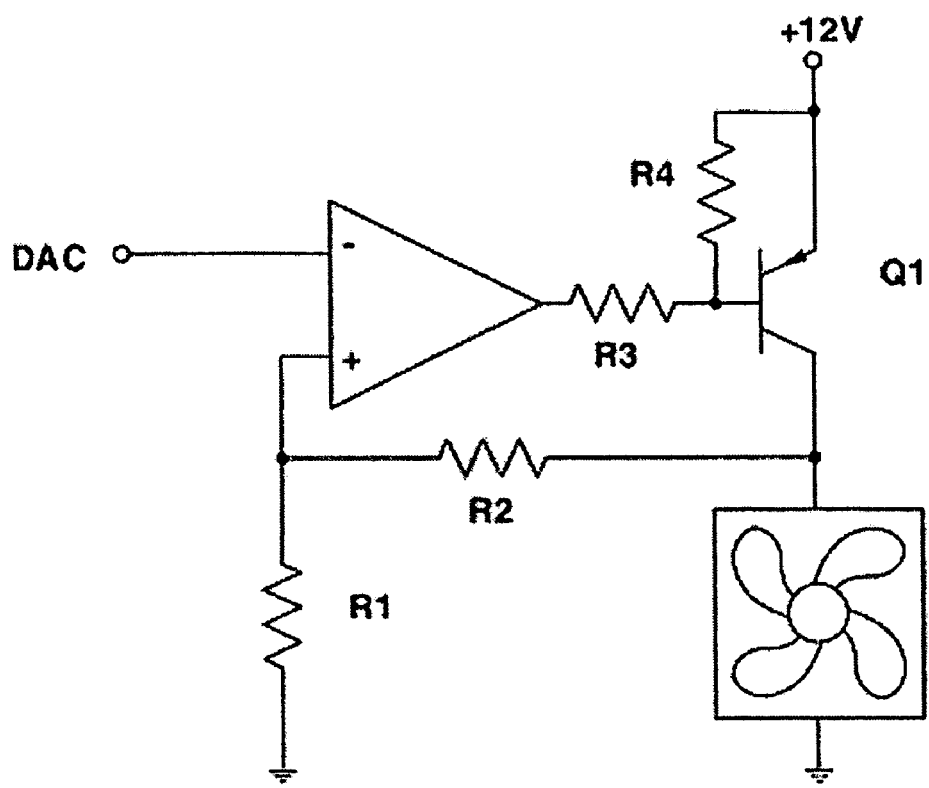
FIG. 3 is an interface circuit used to generate a variable DC signal.
Figure 4:
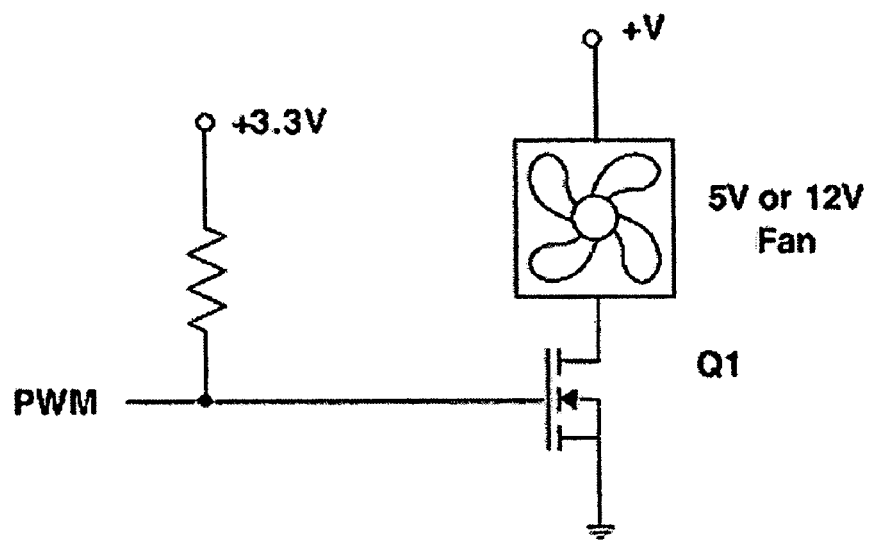
FIG. 4 is an example of a circuit that may be used to vary the duty cycle for PWM applications in accordance with the prior art.
Figure 5:
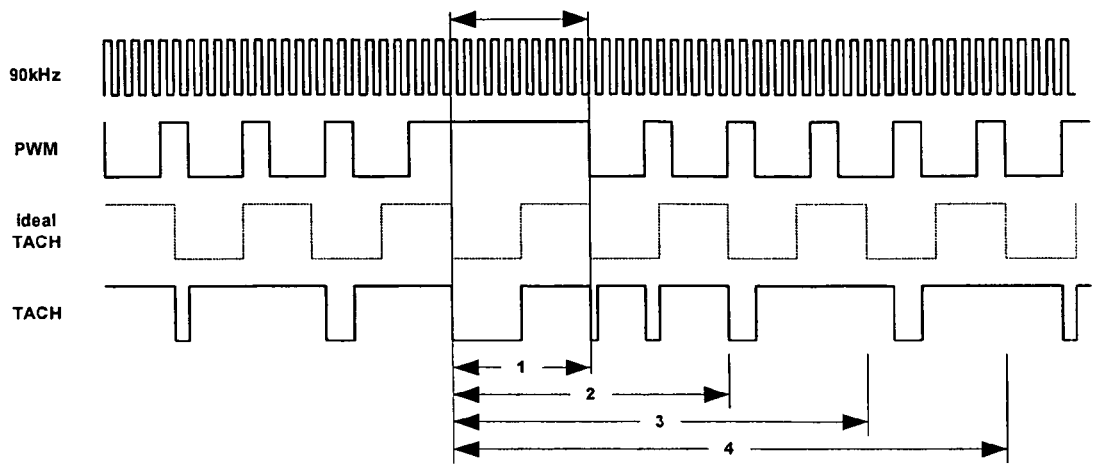
FIG. 5 is a timing diagram showing a stretching of the PWM signal.
Figure 6:
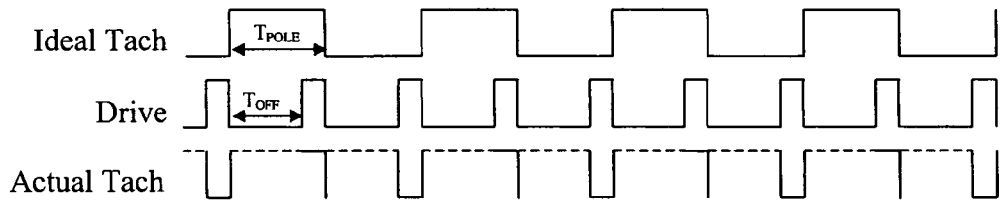
FIG. 6 is timing diagram showing the relationship between an ideal TACH signal, an actual TACH signal and a drive signal in accordance with the present invention.
Figure 7:
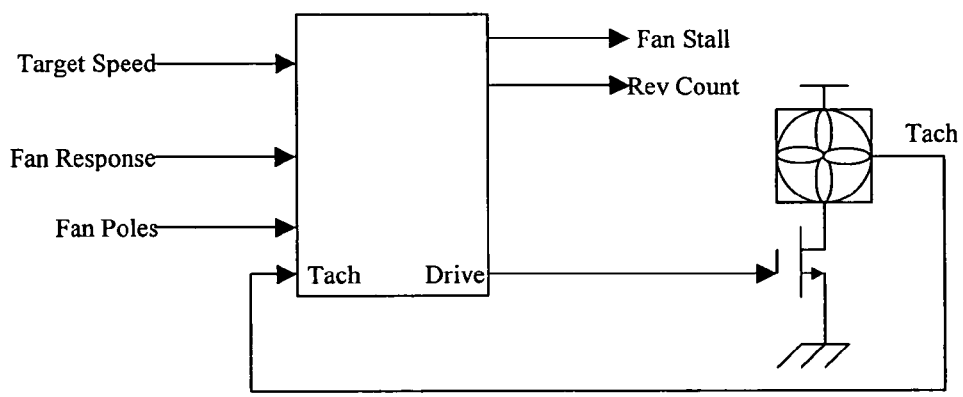
FIG. 7 is a fan speed control circuit in accordance with the present invention.

The present invention provides a synchronous speed control (SSC) system that is a variation on PWM control and synchronizes the PWM signal to the TACH information from the fan. It maintains the advantages of PWM control by using a simple low-side drive fan interface, and also uses the same duty cycle control to vary the speed of the fan. However, as known PWM control has a fixed period that makes it impossible for it to stay in phase with the fan rotation at all speeds, the control system of the present invention overcomes this by using the fan TACH information, and varies the control signal period to match the time it takes to get through one pole of the fan. The TACH signal can therefore be considered a "master" signal with the driving voltage to the fan a "slave" to that master. The drive signal attempts to lock into the TACH signal. In essence, a user defines an optimum revolution speed of the fan for specific conditions and relates these to a desired TACH signal, thereby defining an ideal TACH. As shown in FIG. 6, this desired ideal TACH signal is then used to effect control of the drive signal to the fan, whereby the drive signal attempts, through a feedback configuration, to lock to the actual TACH signal. The actual TACH signal is compared to the desired ideal TACH level and the drive signal modifies the applied voltage to the fan until the two match. An example of such an arrangement is given in FIG. 7. The SSC Fan Speed control loop provides an RPM control loop. The loop attempts to run the fan at a Target Speed, programmed by some means.

The inputs to the control loop include:

Target Count: This is programmed in clock cycles per fan rotation.

Fan Tach: Tach information from the fan.

Fan Poles: The number of poles that the fan has.

Update Rate: Used to compensate for variations in fan response, this varies the maximum speed that the loop can vary by in any rotation. Typically, higher powered fans respond more slowly than smaller ones.

The outputs are:

Drive: The SSC signal used to drive the fan.

Rev Count: This is the number of clock cycles taken for a complete fan rotation.

Fan Stall: An ALERT signal used to tell the user when the fan has stalled, when the fan is supposed to the running.

Figure 8:
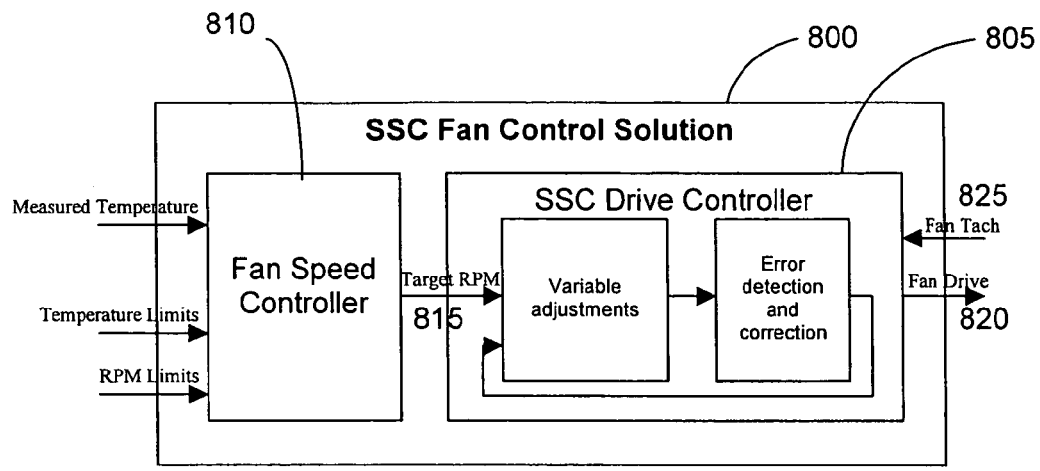
FIG. 8 shows in block diagram form further detail of the control block of the SSC system according to the present invention

FIG. 8 shows in block diagram form further detail of a control block 800 of the SSC system according to the present invention. The SSC control block 800 includes a drive controller 805 and a fan speed controller 810. The Drive controller is responsible for taking in a Target speed 815 for the fan, and making adjustments to a Fan Drive output 820 to achieve this speed. Using some pre-configured information about the fan (e.g., the number of poles, and some information on how quickly the fan responds to the Drive), and the dynamic information received from a Fan Tach input 825, the Drive controller must stay in lock with the fan, and make adjustments as necessary to maintain the required speed. Further detail below will discuss the methods that may be used to do this. The fan speed controller is not concerned with any physical aspects of driving the fan, and does not need to know any information about the fan to function. Its sole responsibility is mapping measured temperature to a pre-programmed set of temperature and RPM speed limits, setting the target speed for the SSC Drive Controller. The configurations possible for the Fan Speed Control loop will be discussed below.

In operation, a target Speed Count of equal to the full scale value of the Speed Count is taken to mean the fan should be stopped. During this time, the Drive output is always low, and the fan speed measurement circuitry is switched off. Once the target speed Count is set to a value lower than this, $T_{OFF}$ is given an initial value of zero to get the fan moving. During this time, the Drive remains high. Once TACH transitions begin to be seen the fan is assumed to be running, so $T_{OFF}$ is adjusted to a higher value. Each time the TACH transitions, the fan is said to have passed a pole. An internal counter continues to count the poles until it equals the Fan Poles parameter programmed by the user. At this time, the fan has completed a full rotation. The TACH count at that time is the total number of clock cycles for one revolution. This time is compared against the Target Count, and if it is higher than expected (fan running too slow), $T_{OFF}$ is decreased. If the Rev Count is lower than expected (fan running too fast), $T_{OFF}$ is increased. These adjustments continue, with adjustments limited by the programmed Update Rate parameter, until the fan reaches an equilibrium speed, or until the Target Fan Speed changes. To set the fan to full speed, the target Speed Count should be set to zero. This ensures that the Drive is always on. During this time, the algorithm continues to get fan speed information.

As the Fan speed control loop is a closed loop system, it is able to compensate for factors that might otherwise cause the fan to unexpectedly slow down or stop. If the fan starts to slow down because of any reason, $T_{OFF}$ is adjusted to compensate for this, and to bring the fan speed back up to the desired value.

A beneficial side effect is that any speed measurements made on the fan don't require the SSC signal to be disturbed. This in turn means that the fan speed is not disturbed by the measurements, and so the speed measurements are very accurate. A further advantage of not disturbing the fan speed during speed measurement is the removal of the acoustic 'hunting noise' caused by performing speed detection when using PWM control. Because SSC operates in a closed feedback loop with the TACH signal of the fan, it has a greater range of operation than either PWM and Linear Speed control, and therefore eliminates any fan to fan variation as is the case with the other control schemes.

In accordance with the synchronous speed control (SSC) arrangement of the present invention, the controller uses an internal counter, in conjunction with TACH information from the fan to determine when to switch the SSC signal on and off. As already mentioned, each time the fan rotor passes a pole, the fan TACH signal toggles.

In its simplest form, each time the TACH toggles, the SSC Drive switches off for a time $T_{OFF}$. Once $T_{OFF}$ has elapsed, the Drive switches on again, and waits for the TACH to change, and repeats the process. By varying $T_{OFF}$, the fan speed can be varied.

However, there are a number of conditions that can cause this to fail.

Time between applying a drive signal and getting back TACH information

Fan slows down quickly.

Fan speeds up very quickly.

Fan pole spacing errors at low speeds.

Fan stall.

In order to counteract the above problems, a number of fan speed error detection and recovery techniques may be used to make SSC a robust and reliable fan controller. The following discusses each of the fail conditions in turn, looking at their observable effects, and outlining the developed solutions in accordance with the present invention.

EM Delay

Figure 9:
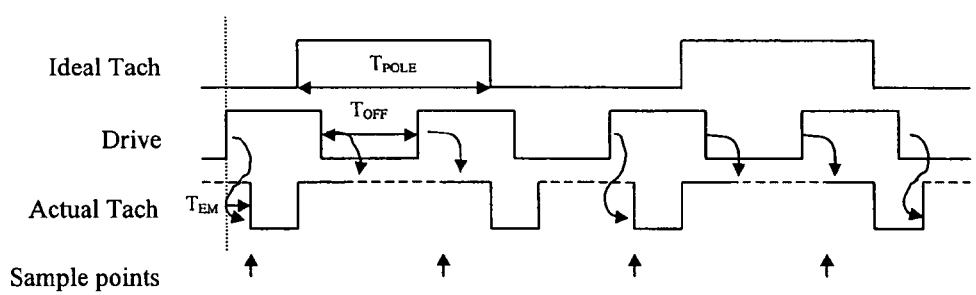
FIG. 9 is a timing diagram showing the effect of EM delay on the operation of a system in accordance with the present invention.

The Synchronous Speed Control system of the present invention relies on using the TACH information from the fan to adjust the period of the SSC signal. If the TACH signal is corrupted in any way, such as that shown in FIG. 9, the algorithm cannot determine the correct period of the SSC pulses, so cannot synchronize to the fan. One of the first issues to be dealt with is delay in the feedback loop. Each time the Drive changes state, it takes a finite amount of time for the effect to be felt by the fan, and for that to be transmitted to the Fan TACH electronics. This delay is called the EM (electro-mechanical) delay of the system. Since the TACH is always pulled high when the Drive signal is inactive, we are only interested in the state of the TACH when the Drive signal is active. Each time the Drive signal switches state from inactive to active, we need to look at the state of the TACH signal. Until the EM Delay elapses, even if the true state of the TACH is low, it will read as high. If this result were to be used, the algorithm would not be able to correctly determine how long it took to complete a fan revolution, and control would be lost. By waiting for the EM delay, we ensure that the algorithm always has valid data to work with. The EM delay can be determined experimentally for any fan by looking at a transition on Drive from inactive to active, and measuring the time it takes for the TACH to change state from high to low, if the true state is low. A margin of safety should then be added to the resulting number, e.g., doubling the worst case measured value for a small number of fans.

Fan Slowing Down

Figure 10:
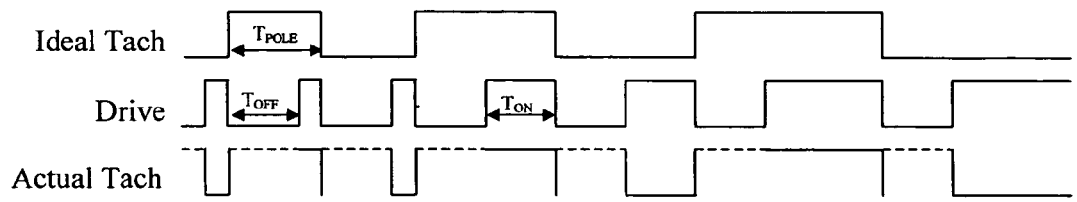
FIG. 10 is a timing diagram showing the effect of the fan slowing down on the operation of a system in accordance with the present invention.

When a fan slows down, the time to complete each pole starts to get longer and longer. An example of such a timing sequence is given in FIG. 10. By its nature, the SSC algorithm compensates for this by increasing the On Time ($T_{ON}$) for the fan drive. Each time the algorithm determines that the TACH has changed state it switches off for time $T_{OFF}$. After $T_{OFF}$ elapses, the TACH is continuously looked at until it changes state again. It should be noted that during this time that the Drive remains active. As the Drive is active for a longer time than in the equilibrium case, the effect will be to try to speed up the fan to hold it at a stable speed. If the fan continues to slow down, the Drive will remain active for longer in an effort to make the TACH change state. At all times, the algorithm is in full control of the fan.

If the intention is to slow the fan down, a longer rotation time needs to be programmed by some means, and this in turn will adjust $T_{OFF}$ to get the fan to a slower stable state. One may choose to do this manually, or in some control loop.

Fan Speeding Up

Figure 11:
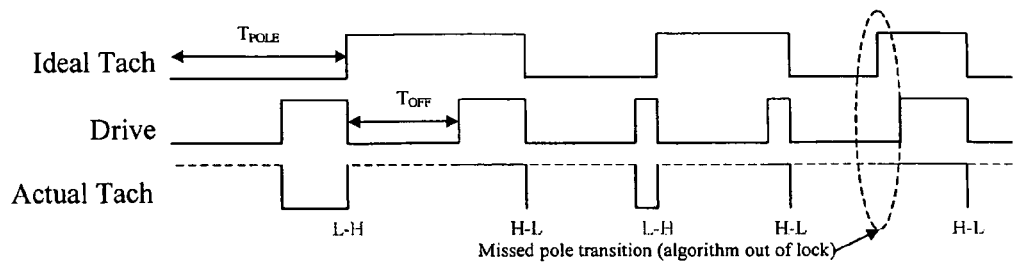
FIG. 11 is a timing diagram showing the effect of the fan speeding up on the operation of a system in accordance with the present invention.

The SSC algorithm uses TACH information from the fan, along with a programmed rotation time to adjust the period and the $T_{OFF}$ time of the SSC signal, synchronizing it to the fan pole transitions. As a fan speeds up, such as shown in FIG. 11, the time it takes to complete a pole decreases. As long as $T_{OFF}$ is small relative to the pole time, this is not a problem. However, if $T_{OFF}$ becomes large relative to the pole time, the $T_{ON}$ time, i.e., the time when the Drive is active, becomes smaller and smaller, so the window to catch a pole transition also shrinks. As well as this, the $T_{OFF}$ time will tend to become as long as the pole time. If $T_{OFF}+T_{EM}$ exceeds $T_{POLE}$, then the algorithm will completely miss the pole. The algorithm is then said to be out of lock with the fan. With the simple algorithm described to date, not only will it be out of lock with the fan, it will also not recognize that it is out of lock with the fan. To be able to deal with this situation, we need some improvements to be made to allow the SSC algorithm to detect and correct for out of lock conditions.

Figure 12:
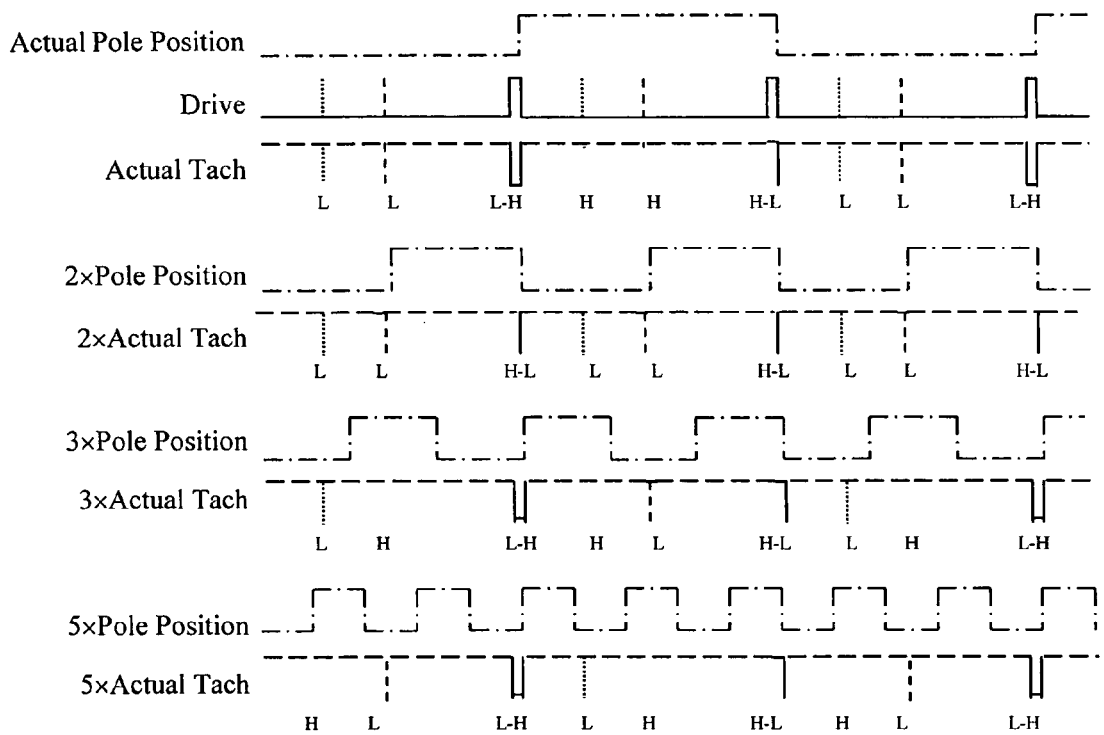
FIG. 12 is a timing diagram showing the effects of losing lock on the TACH signal, and not getting enough samples.

The SSC control loop is a sampled one. Like any sampled system, it must obey the Nyquist principle in order to work correctly. The Nyquist Theorem says that to reliably reconstruct a sampled signal, the sampling frequency must be at least twice the highest frequency of the sampled signal. In the SSC case of the present invention, obeying this rule is complicated by the fact that the sampling frequency, as well as the sampled data frequency is continuously changing. As detailed above, the technique of the present invention provides for a definition of an ideal TACH signal, shown at the top of FIG. 12 as the dash-dot signal, and the modification of the $T_{OFF}$ time when the actual TACH signal does not match this defined ideal TACH signal. This requires a sampling of the actual TACH signal to determine what the level of the TACH signal is at any one time. However, the actual TACH signal can only be sampled when the drive signal is on. When the drive signal is off, there is no information available about the TACH signal—shown in FIG. 12 as the long dash signal. However, in accordance with sampling techniques assumptions can be made about the level. At low $T_{OFF}$ values, the Nyquist rule is easily obeyed, whereas at large $T_{OFF}$ values, the Nyquist rule, without some intervention, may be broken, and will cause difficulty. This could result in the fan running at a speed multiple of what the controller interprets from the TACH signal. FIG. 12 illustrates the effects of losing lock on the TACH signal, and not getting enough samples. The unbroken lines show the Drive and TACH signals for the simple algorithm with no error detection or recovery. The algorithm is considered to be in lock with the fan if each consecutive TACH transition alternates from High to Low, and Low to High. If the fan begins to run 2 times faster than expected, this can be detected and corrected for, as you get only HIGH to LOW, or only LOW to HIGH transitions on the TACH. Steps can then be taken to compensate for this. However, it can be seen that for this method, it would be possible to get into a situation where the fan is running 3, or even 5 times faster than expected, and to lock to the incorrect fan speed.

To detect and correct for situations where the fan is running 3 or 5 times faster than expected, the present invention provides for the insertion of additional sampling points. As there is a requirement for the drive signal to be on to achieve sampling of the actual TACH signal, the insertion of the additional sampling points is achieved by momentarily turning on the fan drive long enough to determine the state of the fan TACH signal. As seen in FIG. 12, a first sampling signal is provided at time, ¼ $T_{OFF}$, shown in the Figure as dotted. These monitoring points enable detection of a fan running 5 times faster than expected, as the TACH level sensed at the 5× detection point will be opposite to the expected value. This information can then be used to compensate for this by reducing the $T_{OFF}$ time to a value within $T_{POLE}$. As the algorithm returns to lock, the fan speed will reach an equilibrium value at the correct speed. However, the ¼ $T_{OFF}$ point is not enough to detect a fan running at 3 times the expected speed.

To detect a fan running at 3 times the expected speed, another TACH detection sampling point is inserted at ½ $T_{OFF}$, shown within the Figure as the short dash line inserted between the normal drive signal and the sample signal provided at ¼ $T_{OFF}$. The function of this point works exactly the same way as the ¼ $T_{OFF}$ point, except that is allows fan running 3 times faster than expected to be detected and corrected for, in the same way as before.

It will be apparent to those skilled in the art that the duration of these monitoring points need to be at least $T_{EM}$. Otherwise, the TACH information should be considered incorrect. Typically $T_{EM}$ is of the order of microseconds whereas a full rotation of the fan is at least an order of magnitude longer. It will be further appreciated that as the purpose of the additional sampling points is to detect for a fan going too fast, i.e., passing poles faster than the predefined $T_{OFF}$ that it is advantageous that the signals are provided in the first portion of the drive signal.

Unequal Pole Spacings

Figure 13:
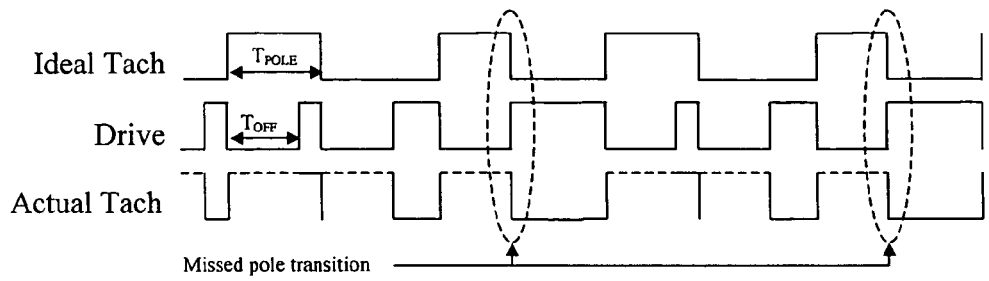
FIG. 13 is a timing diagram showing the effect of unequal pole spacings on the operation of a system in accordance with the present invention.

The technique of the present invention may also be used to compensate for non-equally spaced poles within the fan. As shown in FIG. 13, the Ideal TACH signal shows that the fan has unequal pole spacing. This is due to intentional manufacturing differences in the pole spacing, and not to variations in the fan speed. The reason for the differences in pole spacing is that it makes it easier for the fan to start spinning on start-up if the position of the poles is set up to pull it in a certain direction. If all of the poles were equally spaced, then the fan could get locked into a position where the opposite poles were pulling it equally in opposite directions, so the rotor would just hover around the same point instead of moving through a complete circle.

The variation in pole spacing can cause problems if ignored. For short $T_{OFF}$ times, when there is a long $T_{ON}$, there is no problem. However, as the $T_{OFF}$ time increases towards a time equivalent to the pole time, and the fan slows down, variation in pole spacings becomes significant compared to the reduced $T_{ON}$. This can cause the algorithm to lose lock with the fan when the shorter pole time matches the $T_{OFF}$ and therefore there is no time for $T_{ON}$, and it disappears. Therefore, the algorithm will loose some pole transition information. It is possible to determine when a pole transition has been missed by looking at the TACH information and comparing it with the expected level. Each time you pass a pole, the expected level toggles. When a pole transition is missed, the TACH information from the fan will be the same level as previously measured. It will be noted that when the Drive is inactive, the TACH is pulled high, and the information is not valid.

$T_{OFF}$ Adjustment and the Fan Response Register

In order to lock the SSC Drive signal to the target fan speed, continuous adjustments of $T_{OFF}$ need to be made. As in any closed loop control system, the rate and amount by which $T_{OFF}$ is adjusted needs to be carefully controlled. Overshoot and ringing around the fan speed target should be minimized, while still allowing a fast enough response to target speed changes to minimize lag.

Figure 14:
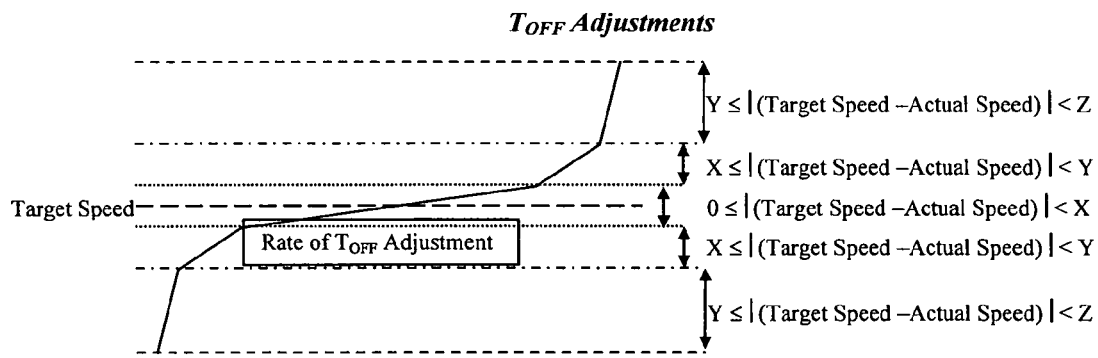
FIG. 14 is an example of how the rate of change of $T_{OFF}$ may be varied depending on the difference between the desired and actual speed of the fan.

The basic way in which $T_{OFF}$ is adjusted is to allow large changes in $T_{OFF}$ each time it is updated when the actual fan speed is a long way from the target fan speed, and to limit the amount that $T_{OFF}$ is changed when the actual fan speed becomes close to the target speed. Such a variable response is illustrated in FIG. 14, where a example of large changes being made to $T_{OFF}$ are possible when the actual speed is much different to the desired target speed, and small changes when the two converge.

In addition to the difference between the actual and target speed, other factors need to be taken into consideration, such as the speed of response of the particular fan that is being controlled. Fans that have a slow response can take a long time to show a change in speed due to $T_{OFF}$ adjustments. If $T_{OFF}$ is adjusted by too much too soon, the fan will then overshoot the target speed, and some ringing around the target speed will be seen. The adjustments in $T_{OFF}$ need to be slowed down, as well as limited to stop this from happening. On the other hand, for a fan with a very fast response to changes in $T_{OFF}$, adjustments that are made too slowly will cause unnecessary delays in the fan speed reaching its target value. In this instance, we would wish to make adjustments to $T_{OFF}$ more quickly. In order to achieve this variable response, the present invention provides for a Fan Response register with a number of different settings used to control the rate of update of $T_{OFF}$ that allows us to do the above function. It will therefore be appreciated that $T_{OFF}$ may be adjusted both in length, i.e., the amount by which it is adjusted, and frequency, i.e., the time interval between adjustments. The former parameter is related to the distance between the actual speed and the desired speed of the fan whereas the latter parameter is a specific to the fan and can be programmed as a fan response parameter by a user.

Look Up Table

The fan speed control loop controls the fan speed around a programmed target speed. There are a number of ways to program the target speed. It can be manually programmed as part of a software control loop, or a hardware control loop can be used. One example of a hardware control loop is a Look Up Table (LUT). A number of different types are available.

Discrete Mode LUT

Figure 15:
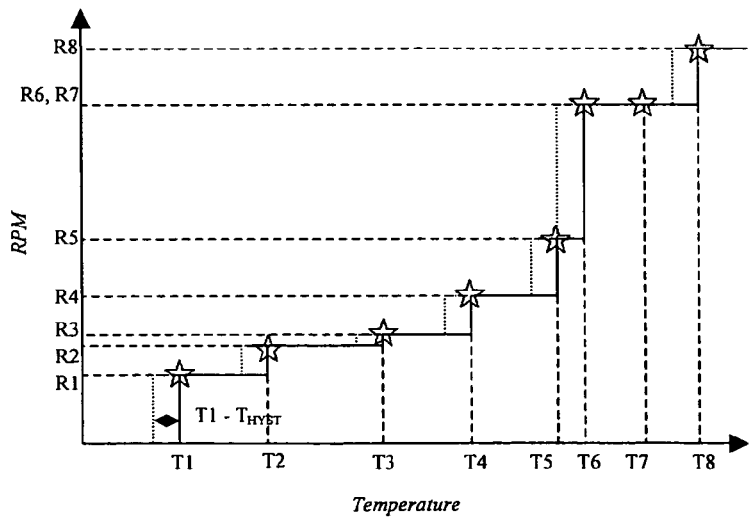
FIG. 15 is an example of a discrete mode look-up table for use with the system and method of the invention.

FIG. 15 is an example of an 8-point discrete LUT mapping measured temperature to target fan speed. For any temperature below T1, the fan is off. Once the temperature reaches T1, the fan switches on, and the fan control loop tries to make the fan speed equal to R1. The fan speed will not increase above R1 until the temperature reaches T2, when the target fan speed changes to R2. This continues for the rest of the points on the LUT. As temperature decreases, crossing the LUT temperature points, the target fan speed also decreases. To prevent fan speed oscillations about the LUT temperature points, a programmable hysteresis value, $T_{HYST}$, is provided. For example, as the temperature decreases from T2 to T1, the target fan speed will remain at R2 until the temperature decreases to T2-$T_{HYST}$. The fan will not switch off until the temperature decreases to T1-$T_{HYST}$. The LUT in the above mode of operation is referred to as a Discrete LUT.

Linear Mode LUT

Figure 16:
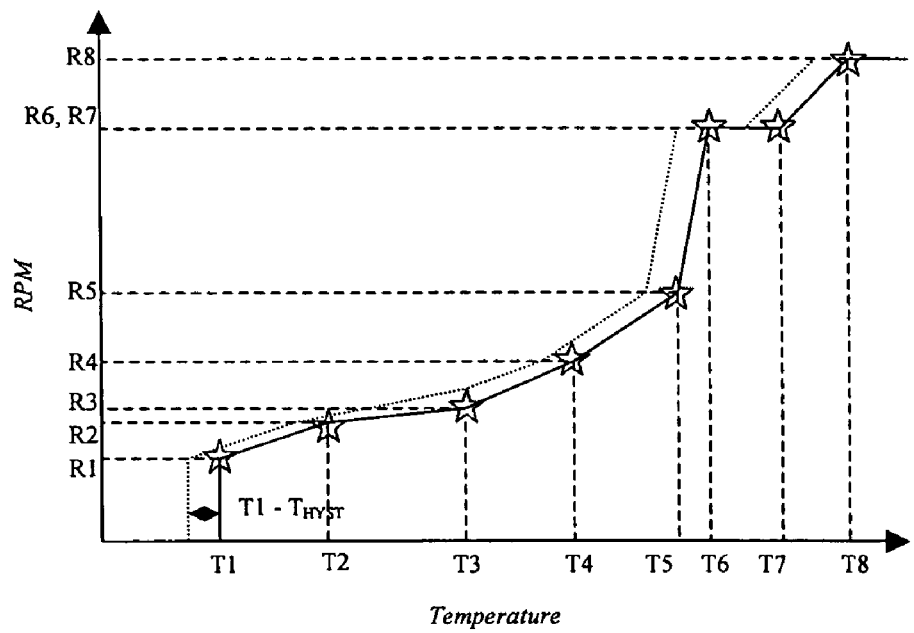
FIG. 16 is an example of a linear mode look-up table for use with the system and method of the invention.

The 8-point linear mode LUT shown in FIG. 16 operates in much the same way as the discrete mode LUT of FIG. 15. As long as the temperature remains below T1, the fan remains off. Once the temperature increases above T1, the fan switches on. At T1, the target fan speed is R1. As the temperature increases towards T2, the target fan speed increases linearly to R2, unlike the discrete mode case where the fan speed remained at R1 until the temperature reached T2. As the temperature decreases, the user can choose the programmable LUT hysteresis value, as in the discrete mode case. This is useful for the T1 to Fan Off transition point, where the fan speed turns off once the temperature decreases below T1-$T_{HYST}$.

For any given temperature between T1 and T8:

$$RPM_x = RPM_{low} + (T_x - T_{low})\left(\frac{RPM_{high} - RPM_{low}}{T_{high} - T_{low}}\right)$$

$T_{high}$=Next highest temperature limit $RPM_{high}$=Next highest RPM limit $T_{low}$=Next lowest temperature limit $RPM_{low}$=Next lowest RPM limit $T_x$=Measured temperature $R_x$=Calculated target RPM The linear LUT is a much smoother control method that avoids large variations in fan speed at temperature transition points. Both Discrete and Linear LUT control methods give extensive control of the Temperature to Fan Speed profile. However, if a simpler profile is required, it can be accommodated by programming the temperature and RPM points of interest, in the lower part of the LUT, and programming full-scale temperature and RPM values in the remaining spaces.

Ratio Mode LUT

Figure 17:
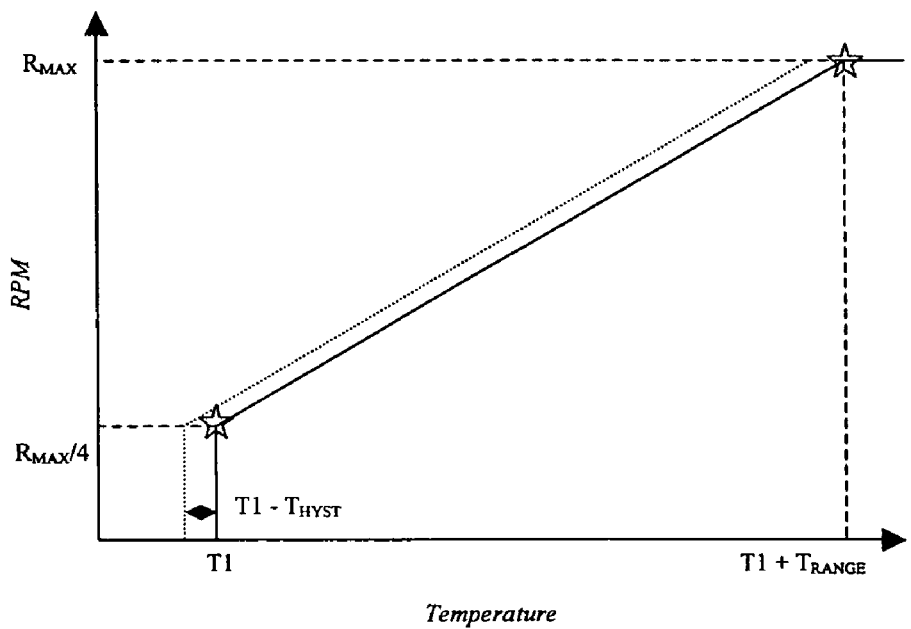
FIG. 17 is an example of a ratio mode look-up table for use with the system and method of the invention.

FIG. 17 shows a Ratio mode LUT. This is a simpler LUT in that it requires only 2 temperatures and one RPM value to be programmed for any fan. In this mode of operation, the fan stays off while the temperature remains below T1. As soon as the temperature reaches T1, the target fan speed goes to $R_{MAX}/4$. As temperature increases, the target fan speed increases linearly until a temperature T1+$T_{RANGE}$ when the fan speed reaches $R_{MAX}$. As temperature decreases, the target fan speed decreases linearly until the temperature decreases to T1-$T_{HYST}$.

Controlling Multiple Fans

All of the LUT methods that have been looked at so far are only used to control a single fan. However, they can also be used to control two fans. In the Discrete and Linear LUT case the same 8 points can be used to control the two fans, or the 8-point LUT is split into two 4-point ones. In this case, the first 4 Temperature and RPM pairs are used to control Fan 1, while the remaining 4 control Fan 2. The operation is similar to the 8-point LUT.

For the Ratio mode LUT, a second fan can be added by programming an extra $R_{MAX}$, for Fan 2, and an extra T1 point. The $T_{RANGE}$ parameter is shared between both fans. The operation of the LUT remains the same.

Example Flow Sequence of Operation

Figure 18:
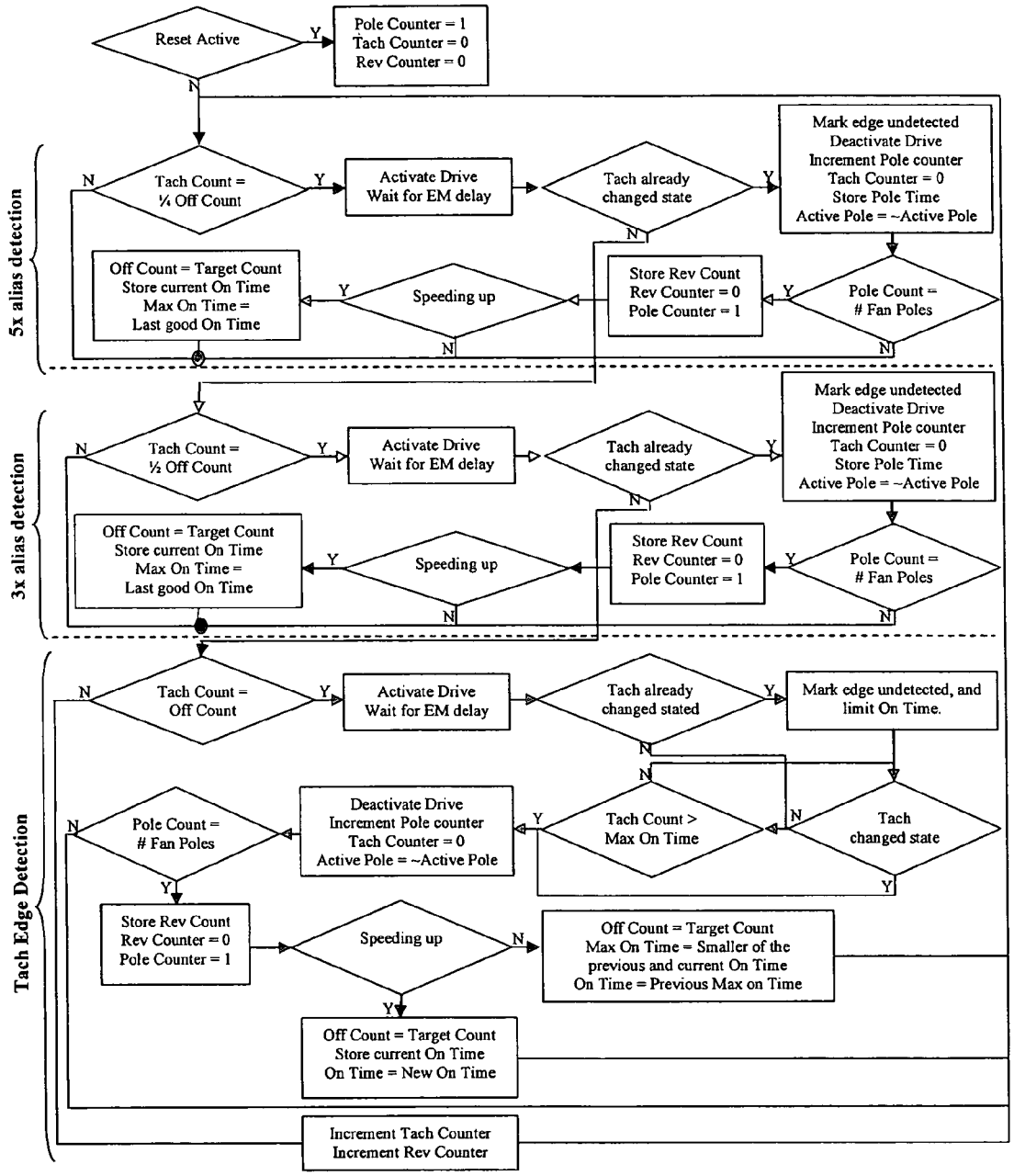
FIG. 18 shows an example flow sequence for use with the methodology of the present invention.

FIG. 18 shows an example flow sequence for use with the methodology of the present invention.

The SSC detection circuit of FIG. 8 contains a number of counters:

Pole Counter—counts the number of fan poles, tracking a revolution.

TACH Counter—counts the number of clock cycles to complete a pole.

Rev Counter—counts the number of clock cycles to complete a revolution.

It also contains a number of registers:

Rev Time—Register containing the time to complete the last revolution.

Pole Time—Number of clock cycles to complete the last pole.

Off Time—Number of clock cycles before activating Drive.

On Time—Number of clock cycles that Drive was active in the last pole.

Max On Time—Number of clock cycles that Drive is allowed to wait before assuming that the TACH edge has been missed.

Active Pole—Used to determine the expected TACH level. It alternates between HIGH and LOW for alternate poles.

The sequence of events is as follows:

1) On reset, all the counters and registers are set to initial values. The Drive signal is inactive (OFF).

2) Once out of reset after the TACH counter reaches ¼ $T_{OFF}$, the Drive is switched ON. After waiting for the EM delay to elapse, the TACH is checked against the expected level, and then the Drive switches off.

If the TACH state is equal to the Expected TACH level:
The TACH counter and Rev counter continue to increment and continue to step 3.

If the TACH state is opposite to the Expected TACH level:
The algorithm assumes that the TACH has already changed state (i.e., it has missed the pole transition). The pole counter is incremented, the Expected TACH level s toggled, the Pole time is saved, and the TACH Counter is reset to zero.
If the Pole Counter is equal to the number of fan poles, Rev Count is stored, the REV Time register and Rev Count is reset to zero.

3) After the TACH counter reaches ½ $T_{OFF}$, the Drive is switched ON. After waiting for the EM delay to elapse, the TACH level is checked against the expected level, then the Drive switches off.

If the TACH state is equal to the Expected TACH level:
The TACH counter and Rev counter continue to increment and continue to step 4.

If the TACH state is opposite to the Expected TACH level:
The algorithm assumes that the TACH has already changed state (i.e., it has missed the pole transition). The pole counter is incremented, the Expected TACH level is toggled, the Pole time is saved, and the TACH Counter is reset to zero.
If the Pole Counter is equal to the number of fan poles, Rev Count is stored in the Rev Time register, and Rev Count is reset the to zero.

4) Once the TACH Counter reaches the $T_{OFF}$, the Drive is switched ON. After waiting for the EM delay to elapse, the TACH level is checked.
If the TACH level is already at the expected TACH level:
The TACH edge has been missed, so the edge is marked as undetected. The Max On Time is for the next pole is limited to the last known good On Time. Switch off Drive and return to Step 2.
If a TACH edge is detected before the Max On Time elapses:
Increment the pole counter, toggle the Expected TACH level, and store the Pole Count.
If the Pole count is equal to the number of fan poles, store the Rev Count in the Rev Time Register, and reset counter to zero. Get the new target TACH count.
Switch OFF the Drive.

It should be noted that at no point is any counter allowed to overflow. Once a counter fills, it will be held at full scale until it can be cleared.

Figure 19:
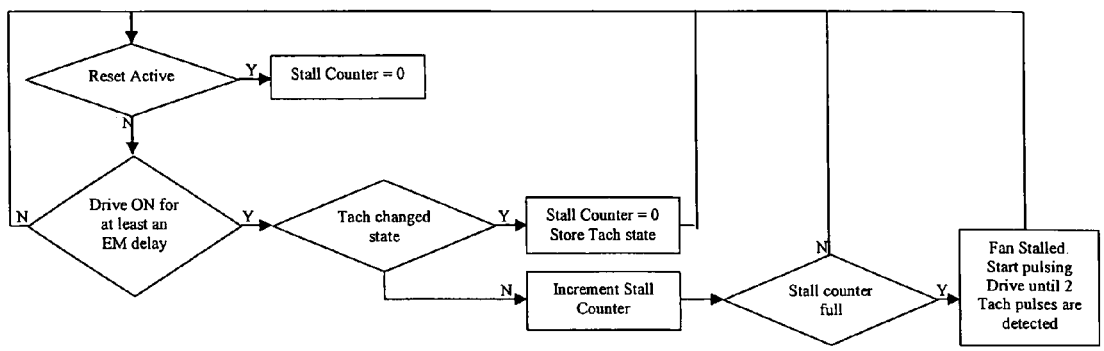
FIG. 19 shows a specific sequence that may be adopted to ensure that any stalling of the fan may be detected and rectified.

FIG. 19 shows a specific sequence that may be adopted to ensure that any stalling of the fan may be detected and rectified. The SSC control algorithm needs to be able to determine when the fan has stalled, so that the user can be alerted when there is a problem with the fan.
1. On reset, the Stall counter is reset to zero.
2. If the Drive is OFF, no stall checking takes place, as there is no reliable data coming from the fan TACH.
3. Once the Drive has been switched ON for at least an EM delay, the state of the TACH level is checked.
If the current TACH level is different than the last detected TACH state:
The fan is assumed to be moving, so the Stall counter is reset to zero. The new TACH level is stored.
Otherwise:
The Stall counter increments.
4. If the stall counter fills, the fan is assumed to have stalled.
The user should be alerted to the stall.
The Drive output is pulsed ON and OFF at a rate of approximately 0.5 Hz in an attempt to restart the fan. When 2 TACH state changes have been detected, the fan is assumed to be running again.

Figure 20:
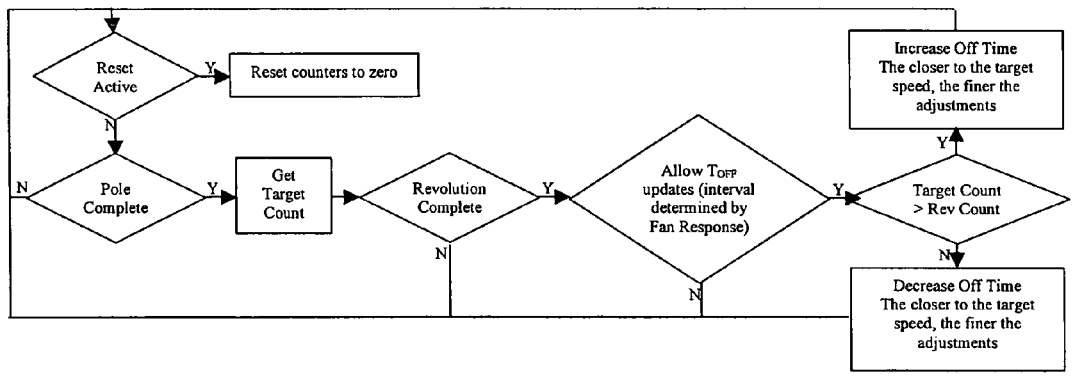
FIG. 20 shows how the system of the invention provides for reaching a desired fan speed.

FIG. 20 shows how the system of the invention provides for reaching a desired fan speed. For any range of fans running at the same speed, it is unlikely that the Off Time, $T_{OFF}$ required for the fan to run at the target speed would be the same for each of them. An RPM control solution is put in place around the SSC controller, allowing the Off Time, $T_{OFF}$ to be continuously adjusted to get to the target speed.
1. On reset, the Pole counter, and Rev counter are both set to zero.
2. When reset is deactivated, the Rev counter counts the clock cycles it takes to get through a revolution. On each completed pole, the Pole counter is incremented and a new Target speed is captured.
3. As each revolution completes, the updated Target count is compared against the count for the revolution just gone. If the fan is running slower than it needs to be, the Off Time is decreased, and if the fan is running faster, the Off Time is increased. The amount by which the Off Time changes is dependent on how far away from the required speed the actual fan speed is. For large differences in Target and Actual fan speed, the Off Time is allowed to change by a large amount, but as the differences get smaller, so does the limit on the change in Off Time per revolution.

It will be noted that depending on the speed of response of the fan to the algorithm, it may be useful to have some flexibility on the rate of change of Off Time. Larger fans tend to respond more slowly, and can tolerate larger Off Time changes without causing the fan speed to overshoot the Target speed. This rate of change parameter may be programmed in the Fan Response register such as what was described with reference to FIG. 14.

What has been described herein is an improved circuit and technique for providing synchronizing the drive signal of a DC motor with the rotation of the fan. The technique of the present invention can be used to ensure that the on portion of a pulsed drive signal can be synchronized with the passage of a fan rotor past the magnetic poles of the motor. By synchronizing the drive signal with the TACH signal of the motor, the present invention provides for a more efficient control of the speed of the rotor.

Although the invention has been described with reference to preferred embodiments, parameters and performance values, it will be understood that it is not intended that the invention be limited in any way except as may be deemed necessary in the light of the appended claims. It will be also understood that although specific features of the invention are shown in some drawings and not others, this is for convenience only as each feature may be combined with any or all of the other features in accordance with the invention.

Furthermore, uunless the context clearly requires otherwise, throughout the description and the claims, the words 'comprise', 'comprising', and the like are to be construed in an inclusive sense, as opposed to an exclusive or exhaustive sense; that is to say, in the sense of "including, but not limited to".

What is claimed is:

1. A method of synchronizing a pulsed drive signal applied to a DC fan motor to the TACH output of the motor, the motor including a rotor that rotates in a path defined by a plurality of magnetic poles, the method comprising:
    a) defining an ideal TACH output for a specific rotation speed of the rotor of the DC fan, said ideal TACH output being related to the ideal rate passing of a magnetic pole of the fan by the rotor,
    b) monitoring the actual TACH output of the DC fan, the TACH output indicating the passing of the magnetic poles of the fan by the rotor,
    c) comparing the monitored TACH output to the ideal TACH output, and
    d) changing the period of the drive signal if the monitored TACH output does not match the ideal TACH output such that the period of the drive signal matches the time taken for the fan to rotate through one magnetic pole of the fan.

2. A method of synchronizing a pulsed drive signal applied to a DC fan motor to the TACH output of the motor, the motor including a rotor that rotates in a path defined by a plurality of magnetic poles, the method comprising the steps of:
    a) defining a time period for the rotor to rotate between two adjacent poles,
    b) using the defined time period to define an ideal TACH output for a specific rotation speed of a rotor of the DC fan,
    c) monitoring the actual TACH output of the DC fan, the TACH output indicating the passing of the magnetic poles of the fan by the rotor,
    d) comparing the monitored TACH output to the ideal TACH output, and
    e) changing the period of the drive signal if the monitored TACH output does not match the ideal TACH output such that the period of the drive signal matches the time taken for the fan to rotate through one magnetic pole of the fan.

3. The method according to claim 1 or claim 2 wherein the duty cycle of the drive signal is changed by changing the length of time, $T_{OFF}$, for which the drive signal is turned off.

4. The method according to claim 3 wherein the drive signal is turned off each time, for the time $T_{OFF}$, when the actual TACH signal indicates that the fan rotor has rotated to the start of the next pole.

5. The method according to claim 4 wherein the drive signal is turned on once the duration of $T_{OFF}$ is complete, the drive signal being turned off again once the actual TACH signal indicates that the fan rotor has rotated to the start of another pole of the fan.

6. The method as claimed in claim 1 or claim 2 the actual TACH signal is only monitored when the drive signal is on.

7. The method as claimed in claim 6 wherein the monitoring of the actual TACH signal provides an indication of whether the actual TACH signal is at a high level or at a low level, the actual TACH signal flipping between the high and low levels on passing of a magnetic pole.

8. The method as claimed in claim 7 wherein the monitoring of the level of the actual TACH signal provides a tracking of the rotation of the rotor of the fan.

9. The method as claimed in claim 8 further including the step of sampling the level of the actual TACH signal during a time $T_{OFF}$ when the drive signal is normally off.

10. The method as claimed in claim 9 wherein the step of sampling the level of the actual TACH signal is effected by turning the drive signal on for a time period sufficient to enable a detection of the level of the TACH signal.

11. The method as claimed in claim 10 wherein the level of the actual TACH signal is sampled more than once during the $T_{OFF}$ time.

12. The method as claimed in claim 11 wherein two sample signals are applied, a first sample signal at a time approximately equivalent to ¼ $T_{OFF}$ and the second at a time ½ $T_{OFF}$.

13. The method as claimed in claim 12 wherein the duration of each sample signal is greater than a predetermined electromechanical delay $T_{EM}$, the electromechanical delay being determined by looking at a transition on the drive signal from off to on, and measuring the time it takes for the actual TACH signal to change state from high to low, if the true state is low.

14. The method as claimed in claim 9 wherein sampling the level of the actual TACH signal during a time $T_{OFF}$ when the drive signal is normally off provides an indication as to whether the actual fan speed is a multiple of the speed indicated by the monitored actual TACH level.

15. The method as claimed in claim 14 further including, on determining that the actual speed is a multiple of the speed indicated by the monitored actual TACH level, correcting the actual speed to reflect the monitored actual TACH level.

16. The method as claimed in claim 15 wherein the correction is effected by reducing the duration of the off time $T_{OFF}$ of the drive signal.

17. The method as claimed in claim 16 wherein the off time $T_{OFF}$ is reduced to a time period shorter than the time period for the fan rotor to pass adjacent poles, $T_{POLE}$.

18. The method as claimed in claim 7 wherein the level of the TACH signal is monitored after a predetermined time delay, an electromechanical (EM) delay $T_{EM}$, has passed since the switching of the drive signal from an off condition to an on condition.

19. The method as claimed in claim 18 wherein the EM delay $T_{EM}$ is determined by looking at a transition on the drive signal from off to on, and measuring the time it takes for the actual TACH signal to change state from high to low, if the true state is low.

20. The method as claimed in claim 6 further including the step of sampling the level of the TACH signal continuously while the drive signal is on.

21. The method as claimed in claim 3 wherein the off time of the drive signal, $T_{OFF}$, is adjustable, an adjustment of $T_{OFF}$ effecting a change in the speed of the fan motor.

22. The method as claimed in claim 1 or claim 2 wherein the defined ideal TACH output is provided by a look up table.

23. The method as claimed in claim 22 wherein the look up table is a discrete mode look up table.

24. The method as claimed in claim 22 wherein the look up table is a linear mode look up table.

25. The method as claimed in claim 22 wherein the look up table is a ratio mode look up table.

26. The method as claimed in claim 1 or claim 2 wherein the defined ideal TACH output is provided by a plurality of user inputs.

27. The method as claimed in claim 26 wherein the plurality of user inputs include the number of poles of the fan and a rotation speed of the fan.

28. The method as claimed in claim 27 wherein the rotation speed of the fan is provided as a direct input by the user.

29. The method as claimed in claim 27 wherein the rotation speed of the fan is related to an operating temperature, the relationship being user defined.

30. The method as claimed in claim 29 wherein the user defined relationship is effected by defining a range of temperature values and relating this defined range to a range of rotation speeds.

31. The method as claimed in claim 1 or claim 2 further including determining the speed of the fan motor by:
  a) defining the number of poles of the fan,
  b) determining when the rotor has passed a first pole of the plurality of poles,
  c) determining when the number of poles passed by the rotor is equivalent to the defined number, and
  d) calculating the time period between step b) and step c) so as to define a total time for a single rotation, thereby providing an indication of the actual speed of the fan motor.

32. The method as claimed in claim 31 further including the step of defining a desired speed for the fan motor.

33. The method as claimed in claim 32 wherein the desired speed is related to an operating temperature of the location of the fan motor.

34. The method as claimed in claim 32 wherein the off time of the fan motor, $T_{OFF}$, is adjustable until the desired speed substantially matches the actual speed.

35. The method as claimed in claim 34 wherein the amount by which the off time $T_{OFF}$ of the drive signal is adjusted may be varied.

36. The method as claimed in claim 35 wherein the variance is related to the difference between the desired speed and actual speed.

37. The method as claimed in claim 34 wherein the frequency at which the off time $T_{OFF}$ is adjusted is configurable.

38. The method as claimed in claim 37 wherein the frequency is related to the characteristics of a particular fan.

39. The method as claimed in claim 1 or claim 2 further including monitoring the change of the actual TACH levels so as to determine whether the fan has stalled, a stall being defined by an occurrence of multiple sequentially monitored actual TACH levels being of the same level.

40. The method as claimed in claim 39 wherein on determining the occurrence of a stall, the drive signal is pulsed on and off until two sequentially monitored actual TACH levels are of a different level.

41. The method as claimed in claim 1 or claim 2 further including forcing the drive signal to a continuous on or a continuous off condition.

42. A DC fan speed controller adapted to synchronize a pulsed drive signal applied to a DC fan motor to the TACH output of the motor, the motor including a rotor that rotates in a path defined by a plurality of magnetic poles, the controller having:
  a) means for defining a time period for the rotor to rotate between two adjacent poles,
  b) computation means for defining an ideal TACH output for a specific rotation speed of a rotor of the DC fan based on the defined time period,
  c) means for monitoring the actual TACH output of the DC fan, the TACH output indicating the passing of the magnetic poles of the fan by the rotor,
  d) means for comparing the monitored TACH output to the ideal TACH output, and
  e) means for changing the period of the drive signal if the monitored TACH output does not match the ideal TACH output, so as to ensure that the period of the drive signal matches the time taken for the fan to rotate through one magnetic pole of the fan.

43. A DC fan speed controller adapted to synchronize a pulsed drive signal applied to a DC fan motor to the TACH output of the motor, the motor including a rotor that rotates in a path defined by a plurality of magnetic poles, the controller having:
  a) means for defining a time period for the rotor to rotate between two adjacent poles,
  b) computation means for defining an ideal TACH output for a specific rotation speed of a rotor of the DC fan based on the defined time period,
  c) means for monitoring the actual TACH output of the DC fan, the TACH output indicating the passing of the magnetic poles of the fan by the rotor,
  d) means for comparing the monitored TACH output to the ideal TACH output, and
  e) means for changing the period of the drive signal if the monitored TACH output does not match the ideal TACH output, so as to ensure that the period of the drive signal matches the time taken for the fan to rotate through one magnetic pole of the fan.

44. The controller as claimed in claim 42 or claim 43 wherein the speed of the fan motor is defined by:
  a) a first register value defining the number of poles of the fan,
  b) a first sensor adapted to determine when the rotor has passed a first pole of the plurality of poles, the first sensor being adapted to effect an update of a second register so as to increment the number of poles passed by the rotor
  c) a comparator adapted to determine when the number of poles passed by the rotor and stored in the second register is equivalent to the defined number, and
  d) a timer adapted to calculate the time period between step b) and step c) so as to define a total time for a single rotation, thereby providing an indication of the actual speed of the fan motor.

45. The controller as claimed in claim 42 or claim 43 wherein the ideal TACH output is related to the operating temperature of the fan.

46. The controller as claimed in claim 42 or claim 43 wherein the means for monitoring the actual TACH output of the DC fan monitors the actual TACH output when the drive signal is on.

* * * * *